United States Patent
Maki et al.

(10) Patent No.: US 9,464,345 B2
(45) Date of Patent: Oct. 11, 2016

(54) HOT DIP AL COATED STEEL SHEET EXCELLENT IN HEAT BLACK DISCOLORATION RESISTANCE AND METHOD OF PRODUCTION OF SAME

(75) Inventors: Jun Maki, Tokyo (JP); Shinichi Yamaguchi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 456 days.

(21) Appl. No.: 13/704,786

(22) PCT Filed: Jun. 21, 2010

(86) PCT No.: PCT/JP2010/060917
§ 371 (c)(1),
(2), (4) Date: Dec. 17, 2012

(87) PCT Pub. No.: WO2011/161833
PCT Pub. Date: Dec. 29, 2011

(65) Prior Publication Data
US 2013/0095345 A1 Apr. 18, 2013

(51) Int. Cl.
*B32B 15/01* (2006.01)
*C22C 38/00* (2006.01)
(Continued)

(52) U.S. Cl.
CPC .............. *C23C 2/12* (2013.01); *B32B 15/012* (2013.01); *C21D 8/0278* (2013.01); *C22C 21/02* (2013.01);
(Continued)

(58) Field of Classification Search
CPC ............... B32B 15/012; C22C 38/00–38/105
USPC ....................................................... 428/653
See application file for complete search history.

(56) References Cited

U.S. PATENT DOCUMENTS 5,993,974 A * 11/1999 Fukushima ............... C03C 8/08
428/433
6,017,643 A 1/2000 Kobayashi et al.
(Continued)

FOREIGN PATENT DOCUMENTS

DE 292392 * 8/1991 ............. B21B 3/02
EP 0 743 373 11/1996
(Continued)

OTHER PUBLICATIONS

English Machine Translation of Maki et al. (JP 2007-107050), JPO, accessed Jul. 25, 2014.*
(Continued)

*Primary Examiner* — Humera Sheikh
*Assistant Examiner* — Lucas Wang
(74) *Attorney, Agent, or Firm* — Birch, Stewart, Kolasch & Birch, LLP (57) ABSTRACT

In conventional Al coated steel sheet, with the Al coating as it is, black discoloration cannot be prevented at 550° C. or more. For this reason, post annealing is used to form a barrier layer and suppress the formation of Fe—Al intermetallic compounds. However, with this method, there were the problems that the steel sheet became poor in workability and, further, high temperature, long time heating was required, so there were problems from the workability, economy, and environmental aspect. The present invention provides steel sheet which has a heat black discoloration resistance even at a 550° C. or more high temperature without additional annealing after Al coating and further is excellent in workability.

That is, it is hot dip Al coated steel sheet which comprises steel sheet which contains predetermined ingredients of C, Si, P, S, Al, N, and O plus one or both of furthermore Ni: 0.01 to 0.1% or Cu: 0.01 to 0.1% and satisfies 10×C+Ni+Cu>0.03 and an Al coating layer which contains Si: 4 to 11% on the surface of that steel sheet and which have a thickness 5 μm or less Al—Fe—Si alloy layer in the interface between the Al coating layer and the steel sheet.

4 Claims, 4 Drawing Sheets

(51) Int. Cl.
    *C23C 2/12*     (2006.01)
    *C21D 8/02*     (2006.01)
    *C22C 21/02*     (2006.01)
    *C22C 38/02*     (2006.01)
    *C22C 38/08*     (2006.01)
    *C22C 38/16*     (2006.01)
    *C22C 38/60*     (2006.01)
    *C23C 2/02*     (2006.01)
    *C23C 2/26*     (2006.01)

(52) U.S. Cl.
    CPC ........... *C22C 38/001* (2013.01); *C22C 38/002* (2013.01); *C22C 38/004* (2013.01); *C22C 38/02* (2013.01); *C22C 38/08* (2013.01); *C22C 38/16* (2013.01); *C22C 38/60* (2013.01); *C23C 2/02* (2013.01); *C23C 2/26* (2013.01); *Y10T 428/12757* (2015.01)

(56) References Cited

U.S. PATENT DOCUMENTS

| | | | |
|---|---|---|---|
| 6,171,413 B1 * | 1/2001 | Funakawa et al. | 148/330 |
| 2001/0016268 A1 | 8/2001 | Maki et al. | |
| 2002/0018909 A1 * | 2/2002 | Mareuse et al. | 428/653 |
| 2007/0089814 A1 * | 4/2007 | Sugiura et al. | 148/602 |
| 2009/0050241 A1 * | 2/2009 | Hashimura et al. | 148/548 |

FOREIGN PATENT DOCUMENTS

| | | | | |
|---|---|---|---|---|
| EP | 1 380 666 | | 1/2004 | |
| EP | 1 669 153 | | 6/2006 | |
| EP | 2 177 642 | | 4/2010 | |
| JP | 63-109110 | | 5/1988 | |
| JP | 8-311629 | | 11/1996 | |
| JP | 9-195021 | | 7/1997 | |
| JP | 2000-144313 | * | 5/2000 | ............... C21D 9/46 |
| JP | 2000-290764 | | 10/2000 | |
| JP | 2004-238682 | | 8/2004 | |
| JP | 2005-330510 | * | 12/2005 | ............... C21D 9/46 |
| JP | 2007-107050 | | 4/2007 | |

OTHER PUBLICATIONS

English Translation of DD292392, Phoenix Translations, Jan. 9, 2015.*

International Search Report dated Sep. 14, 2010 issued in corresponding PCT Application No. PCT/JP2010/060917.

Extended Search Report dated Apr. 17, 2014 issued in corresponding European Application No. EP 10 853 693.9.

Hinoto, Hajime et al.: "Effects of N Steel on Alloying of Plating Layer in Aluminized Steel Sheet at Time of Heating (Research on Aluminized Steel Sheet—I)", Journal of Iron and Steel Institute of Japan, vol. 70 (1984), S475, with an English translation thereof.

* cited by examiner

ALLOY LAYER-STEEL SHEET INTERFACE N INTENSITY (A.U.)

HOT DIP AL COATED STEEL SHEET EXCELLENT IN HEAT BLACK DISCOLORATION RESISTANCE AND METHOD OF PRODUCTION OF SAME

This application is a national stage application of International Application No. PCT/JP2010/060917, filed 21 Jun. 2010, which is incorporated by reference in its entirety.

TECHNICAL FIELD

The present invention relates to hot dip Al coated steel sheet which is free from the phenomenon of the surface of the coating layer discoloring to black even when held at a high temperature of 550° C. or so, excellent in heat black discoloration resistance enabling it to maintain a high heat reflection, and, furthermore, excellent in workability and to a method of production of the same.

BACKGROUND ART

Hot dip Al coated steel sheet which is comprised of steel sheet on which an Al—Si alloy is coated has Si added to the coating layer, so maintains a silver white color and is excellent in heat reflection property even at a high temperature. For this reason, in the past, for example it has been used for mufflers for automobiles and various other heat resistant applications. However, it is known that this hot dip Al coated steel sheet also suffers from interdiffusion of Al and Fe when exposed to a high temperature of 450° C. or more, the Al—Si coating layer changes to an Al—Fe—Si-based intermetallic compound layer and discolors to a black color (hereinafter, unless otherwise indicated, this phenomenon being referred to as "alloying" or "black discoloration", further, ease of black discoloration being referred to as a "black discoloration property"), loses gloss, and is remarkably impaired in heat reflection.

It is known that the amount of the solid solution nitrogen in the steel sheet is deeply involved in this alloying of the Al coating. In steel sheet which contains solid solution nitrogen in a certain amount or more, the fact that an AlN layer is formed at the interface of the alloy layer and the steel sheet and thereby an alloying reaction is suppressed is described in for example, Journal of the Iron and Steel Institute of Japan 70 (1984), S475 etc. Furthermore, it is known that by post annealing steel sheet which contains solid solution nitrogen, this AlN layer grows and, furthermore, the black discoloration temperature rises.

Based on this discovery, the art of suppressing black discoloration due to alloying has been studied in various ways up to now. For example, the applicants disclosed in PLT 1 an Al coated steel sheet giving heat black discoloration resistance by coating steel restricted in amounts of C, Si, N, Al, O, Ti, Nb, V, and B by hot dip Al coating, then annealing the coated steel sheet at 300 to 500° C. for 2 to 20 hours.

PLT 2 takes note of the fact that rimmed steel has a black discoloration temperature of 520° C. or so, while killed steel has a low one of 320° C., so focuses on the solid solution nitrogen (N) in the steel material of the killed steel and proposes a countermeasure. That is, it secures the solid solution nitrogen by restricting the Al and Ti which forms stable nitrides. For this reason, examples of methods of production of cast slabs for hot dip Al coated steel sheet use which define suitable ranges of C, Si, Mn, sol-Al, N, and O in order to obtain the effects of the deoxidation conditions etc. are disclosed.

PLT 3 proposes to coat a steel material of ingredients causing sol-N to stably remain by aluminum coating including a certain extent of Mg and then anneal it at 300 to 500° C. for 2 to 20 hours to form a monoclinic crystal structure of an Fe—Al—Si—Mg alloy between the steel sheet and the coating layer and, furthermore, to form AlN between the intermetallic compound and the steel material so as to prevent black discoloration due to interdiffusion of elements.

PLT 4 discovers that by complexly adding Mn and Cr to an aluminum coating layer and annealing after coating at 300 to 500° C. for 0.5 hour or more, these elements remarkably concentrate at the interface of the alloy layer and coating layer and discloses that this layer exhibits the effect of suppression of alloying. For this reason, it has been proposed that this exhibits the effect of improvement of retention of gloss.

CITATIONS LIST

Patent Literature

PLT 1: Japanese Patent Publication No. 9-195021 A1
PLT 2: Japanese Patent Publication No. 63-109110 A1
PLT 3: Japanese Patent Publication No. 2000-290764 A1
PLT 4: Japanese Patent Publication No. 8-311629 A1

Nonpatent Literature

NPLT 1: Journal of Iron and Steel Institute of Japan, vol. 70 (1984), S475

SUMMARY OF INVENTION

Technical Problem

Even if limiting the ingredients in killed steel as described in the above PLT 2, with just Al coating as is, the black discoloration temperature is similar to that of rimmed steel or 520° C. or so. For this reason, it is not possible to suppress the alloying reaction of Fe—Al at a 550° C. or more high temperature to prevent black discoloration. The arts which are described in PLT 1, PLT 3, and PLT 4 perform Al coating, then perform annealing at 300 to 500° C. for 2 to 20 hours (also called "post annealing") to thereby maintain an Al or an Al—Si coating excellent in light reflection and suppress the formation of an Fe—Al intermetallic compound coating inferior in light reflection, the cause of black discoloration. This is believed because by post annealing, the nitrogen (N) in the steel material which forms the base material and the Al in the coating layer react, an AlN layer is formed at the coating interface, this acts as a barrier layer, and interdiffusion of elements in the steel material and in the coating layer is suppressed. However, post annealing causes the productivity of the steel sheet to greatly deteriorate and invites a massive rise in manufacturing costs. Not only this, it is a method of production which has problems from the viewpoint of the environment such as energy saving and suppression of emission of $CO_2$.

Further, if performing post annealing, depending on the heating conditions, the interface of the steel sheet of the base material and the aluminum coating layer is formed with a monoclinic crystal structure Al—Fe—Si layer. This monoclinic crystal structure Al—Fe—Si layer is harder than the coating layer, so there was the defect of easy cracking while being worked.

In this way, in the prior art, post annealing causes the formation of a barrier layer to thereby suppress the formation of Fe—Al intermetallic compounds, so the workability is poor and further the heating is high in temperature and long in time, so the productivity is poor, the manufacturing costs become high, and there are problems not only in terms of the workability and economicalness, but also the environment. Therefore, the present application has as its task to solve these problems by production of steel sheet which has a heat black discoloration resistance at a high temperature of 550° C. or more without additional annealing after Al coating or at least without the post annealing of conventional Al coated steel sheet and which further is excellent in workability.

Figure 1:
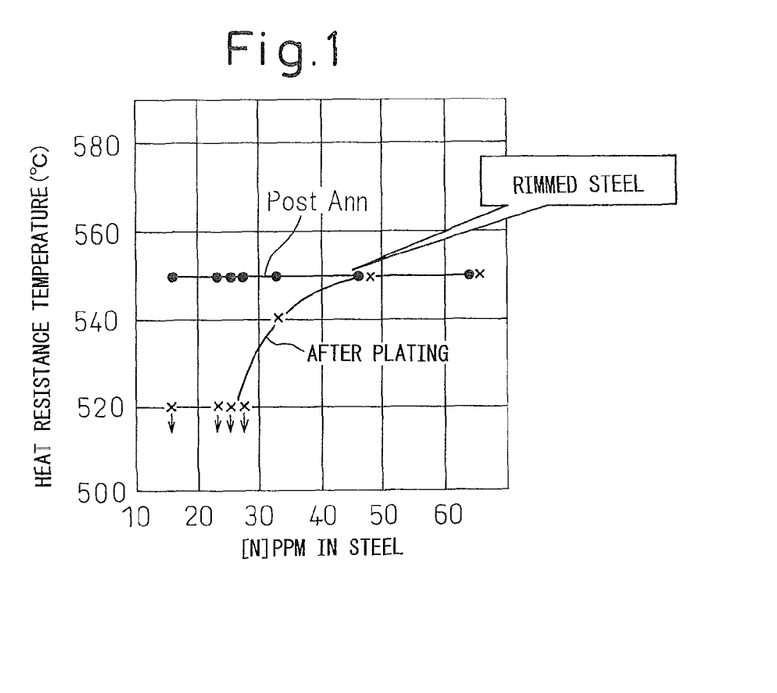
FIG. 1 is a view which shows the relationship of the amount of nitrogen (N) in steel and the heat resistance of the steel material.

Further, in the case of the current mainstream fully killed steel, the amount of solid solution nitrogen is lower than even rimmed steel, so to improve the heat resistance, additional annealing was required after coating. FIG. 1 shows the relationship between the solid solution nitrogen and the heat resistance temperature. The solid solution nitrogen is 46 ppm in rimmed steel. It is learned that if the solid solution nitrogen becomes less than 46 ppm, additional annealing results in the heat resistance being improved.

On the other hand, a steel material with a solid solution nitrogen of more than 46 ppm is poor in workability. When drawn, the frequency of cracks becomes higher. Therefore, this cannot be applied for working complicated shapes. Therefore, in the present invention, another task is the provision of a method of production of less than 46 ppm low solid solution nitrogen steel wherein black discoloration can be prevented without additional annealing and wherein the workability can also be improved.

Solution to Problem

The inventors engaged in intensive studies to solve the above problems and as a result learned that when promoting the formation of an AlN layer at the interface of the steel material and the Al coating layer (hereinafter referred to as the "coating interface"), along with concentration of nitrogen (N), carbon (C) also concentrates. The presence of the austenite former is believed to have some sort of function and to assist the concentration of N. For this reason, the inventors added other austenite formers beside C such as Ni and Cu and investigated the results of assistance of N concentration. As a result, they discovered that these austenite former elements have the effect of assisting N concentration. Further, at the same time, they discovered that the steel sheet of the present invention is also satisfactory in workability and thereby perfected the present invention. The gist is as follows:

(1) A hot dip Al coated steel sheet which is excellent in heat black discoloration resistance which comprises steel sheet which contains, by mass %,
C: 0.0005 to 0.01%,
Si: 0.001 to 0.05%,
P: 0.002 to 0.1%,
S: 0.002 to 0.1%,
Al: 0.001 to 0.01%,
N: 0.0015 to 0.0040%
O: 0.03 to 0.08%, and,
furthermore, one or both of
Ni: 0.01 to 0.1% or
Cu: 0.01 to 0.1%,
satisfies $10 \times C + Ni + Cu > 0.03$, and
has a balance of Fe and unavoidable impurities, on the surface of which steel sheet is provided an Al coating layer which contains, by mass %, Si: 4 to 11% and has a balance of Al and unavoidable impurities, the Al coating layer and the steel sheet interface having a less than 5 μm thick Al—Fe—Si alloy layer between them.

(2) The hot dip Al coated steel sheet which is excellent in heat black discoloration resistance as set forth in (1) wherein an interface of the steel sheet and the Al—Fe—Si alloy layer has AlN present, the Al—Fe—Si alloy layer is a hexagonal crystal structure Al—Fe—Si alloy layer, and that hexagonal crystal structure Al—Fe—Si alloy layer has a thickness of 5 μm or less.

(3) The hot dip Al coated steel sheet which is excellent in heat black discoloration resistance as set forth in (1) or (2) wherein the aluminum coating layer has a Knoop hardness of 90 to 110.

(4) A method of production of hot dip Al coated steel sheet which is excellent in heat black discoloration resistance comprising coating steel sheet which has the steel ingredients as set forth in any one of (1) to (3) as a coating sheet by Al coating during which making an amount of Si in an Al coating bath 4 to 11% and making a bath temperature 610 to 650° C. and then not performing post annealing before working.

Advantageous Effects of Invention

According to the present invention, there is no need for post annealing. It is possible to obtain hot dip aluminum coated steel sheet which is excellent in heat black discoloration resistance and workability even at a 550° C. or higher high temperature. For this reason, compared with the past, the effect is exhibited of the productivity being extremely good and the manufacturing costs being kept low while having the high property of maintaining and improving the gloss with a good heat black discoloration resistance. Further, the heat treatment process is greatly reduced, so the effect can also be obtained of the energy consumption being kept down and $CO_2$ emissions being restrained, so the environmental load being remarkably lowered.

BRIEF DESCRIPTION OF DRAWINGS

FIG. 3(a) mainly shows the distribution of aluminum and iron and FIG. 3(b) mainly shows the distribution of carbon (C) and nitrogen (N).

DESCRIPTION OF EMBODIMENTS

Figure 2:
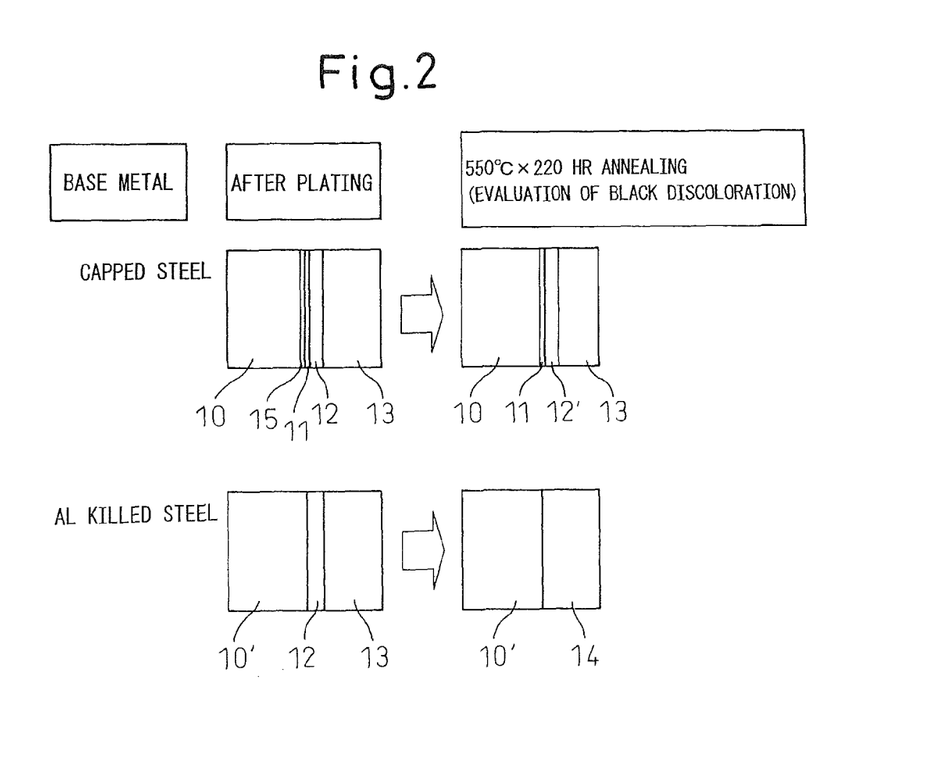
FIG. 2 is a conceptual view which shows a mechanism of black discoloration of a surface of capped steel and aluminum killed steel. The top part shows capped steel, while the bottom part shows aluminum killed steel.

Below, preferred embodiments of the present invention will be explained in detail. First, like in the prior art, we will consider the reasons why additional annealing after Al coating enables the black discoloration property to be reduced (heat black discoloration becoming harder). FIG. 2 gives a brief explanation of that mechanism.

The top part of FIG. 2 shows the example of capped steel which contains a relatively high concentration of solid solution nitrogen (N), while the bottom part shows the example of Al killed steel which has a low concentration of solid solution nitrogen. In the case of capped steel which contains a high concentration of solid solution nitrogen, the following mechanism reduced the black discoloration property. x) First, if coating the base metal capped steel 10 by Al coating, an AlN barrier layer 11 and a hexagonal crystal structure Al—Fe—Si alloy layer 12 are formed between the Al coating layer 13 and the base metal 10 after coating. y) In the subsequent heating at 550° C., the hexagonal crystal structure Al—Fe—Si alloy layer 12 changes to a monoclinic crystal structure Al—Fe—Si alloy layer 12'.

In the present invention, the hexagonal crystal structure Al—Fe—Si alloy layer 12 is also referred to as the (Al—Fe—Si)H, while the monoclinic crystal structure Al—Fe—Si alloy layer 12' is also referred to as the (Al—Fe—Si)M. These both are intermetallic compounds which are formed by the three-way Al—Fe—Si system and respectively have crystalline structures of hexagonal crystals and monoclinic crystals. There is still some room for debate about the precise chemical formulas, but the hexagonal crystal structure Al—Fe—Si alloy layer is said to be $Al_8Fe_2Si$, while the monoclinic crystal structure Al—Fe—Si alloy layer is said to be $Al_5FeSi$.

Further, at this time, an AlN layer 15 is formed between the coating interface (at interface of base material formed by steel material and coating layer). This acts as a barrier layer and inhibits interdiffusion of the elements of the steel material and the coating layer. For this reason, the coating layer does not change to an Al—Fe alloy (intermetallic compound) and a surface with a good light reflection is obtained (FIG. 2, top part).

On the other hand, in the case of Al killed steel which has a low concentration of solid solution nitrogen (FIG. 2, bottom part), if coating the base metal formed by the killed steel 10' by Al coating, since the solid solution nitrogen is small in amount, there is no AlN barrier layer, that is, the above-mentioned barrier layer, and elements interdiffuse between the steel material and the coating layer. As a result, the hexagonal crystal structure Al—Fe—Si alloy layer 12 changes to a monoclinic crystal structure Al—Fe—Si alloy layer and, furthermore, diffuses to the Al coating layer 13 as well to change to an θ-phase or η-phase 14 whereby the concentration of Fe in the coating becomes high and black discoloration occurs (FIG. 2, bottom part).

Figure 3:
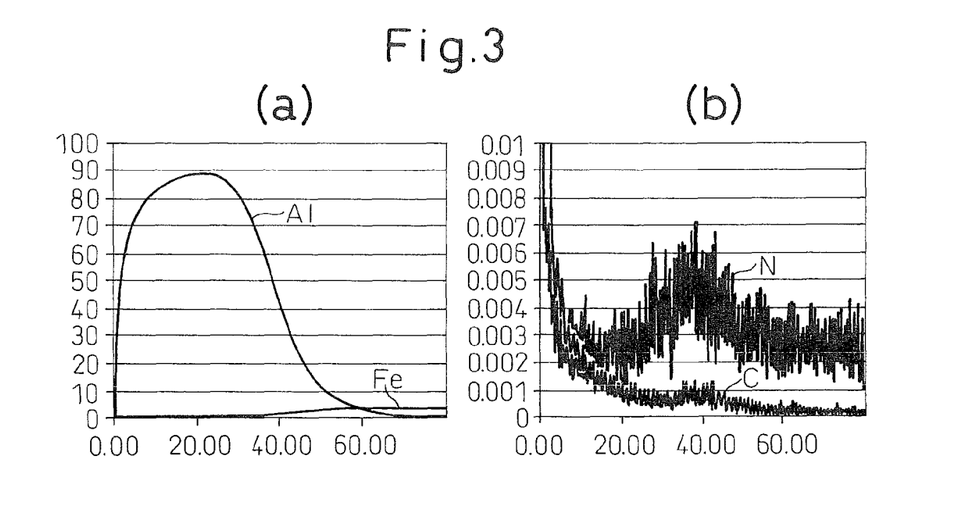
FIG. 3 is a view which shows one example of the results of high frequency GDS analysis of the surface of aluminum coated steel sheet.

Therefore, the inventors took note of the coating interface and tried observing and elucidating the phenomenon which occurs at the coating interface. If analyzing the ingredients and behavior of the coating interface, as shown in FIG. 3, the nitrogen (N) which forms the AlN concentrates at the interface. Concentration of carbon (C) was also observed. FIG. 3 shows the analysis by a high frequency GDS from the surface after Al coating and electrolytic stripping of only the Al coating layer to expose the alloy layer. A high frequency GDS is an analysis apparatus which sputters a surface by Ar gas while measuring the distribution of elements in the depth direction. The abscissa shows the sputtering time, while the ordinate shows the signal intensity, which is proportional to the concentration.

The coating interface (precisely, the interface of the coating layer and alloy layer (intermetallic compound) layer had the austenite-forming element C concentrated at it. N becomes far greater in solid solution degree in the austenite than ferrite. That is, by adding an austenite-forming element which easily concentrates at the surface, it was thought that austenite would be formed for exactly the slight thickness at the surfacemost part and that the N concentration there would rise (N would concentrate). As elements which have such properties, Cu and Ni may be mentioned. The inventors thought that these elements would have similar effects and studied the effects of these elements. As a result, they were able to confirm that if adding Cu or Ni, the coating interface is formed with an AlN layer and a hexagonal crystal structure Al—Fe—Si alloy layer to about 3 μm.

Figure 4:
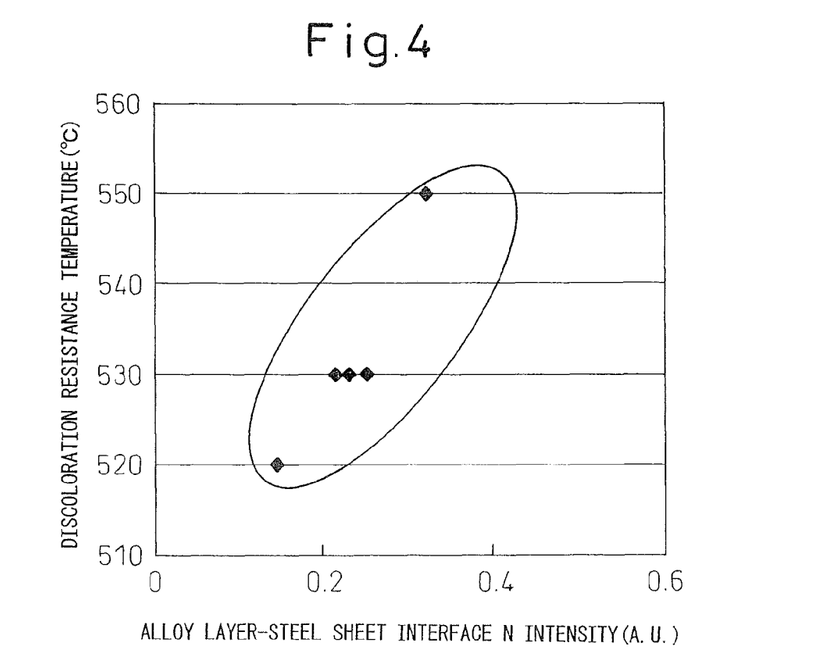
FIG. 4 is a conceptual view which shows the relationship between a peak concentration of AlN (cumulative intensity of N by GDS) and the black discoloration temperature.

FIG. 4 shows the relationship between the peak concentration of AlN (cumulative intensity of N by GDS) and the black discoloration temperature. As will be understood from FIG. 4 as well, the higher the peak concentration of AlN, the higher the black discoloration temperature as well. In other words, it was thought that if forming a firm AlN barrier layer, interdiffusion of elements between the steel material and the Al coating layer would be suppressed and Fe—Al intermetallic compounds would not be formed.

That is, it was learned that even in steel types with solid solution nitrogen concentrations of a low 20 ppm or so, in the same way as conventional rimmed steel, a high concentration AlN and hexagonal crystal Al—Fe—Si alloy layer can be formed. For this reason, even without post annealing, it becomes possible to form Al coated steel sheet which will not discolor black. Further, if adding Cr to the steel sheet, Cr concentrates at the surface of the steel material. Cr is a ferrite-forming element, so if Cr concentrates, it obstructs concentration of the austenite-forming elements C, N, Cu, and Ni and ends up lowering the peak concentration of AlN. Therefore, as much as possible, Cr is not added. If possible, it is not added at all. Similarly, other ferrite-forming elements, for example, Mo, also should not be added.

Next, we will consider why the hexagonal crystal structure Al—Fe—Si alloy layer is effective against black discoloration. When not performing post annealing, it is believed that AlN is formed in the process of cooling after Al coating. At this time, the alloy layer is already formed, so the solid solution nitrogen in the steel reacts with the Al of the alloy layer to form AlN. However, compared with a monoclinic crystal structure Al—Fe—Si alloy layer, a hexagonal crystal structure Al—Fe—Si alloy layer reacts more easily with the solid solution nitrogen in the steel and a result, it is believed, AlN is produced.

That is, at the interface of the AlN and the Al coating layer, not a monoclinic crystal structure Al—Fe—Si alloy layer, but a hexagonal crystal structure Al—Fe—Si alloy layer is present, so it is believed that a synergistic effect with the barrier effect of suppression of interdiffusion of the Fe—Al by which AlN is easily formed can be expected. That is, the hexagonal crystal structure Al—Fe—Si alloy layer is effective for forming AlN. However, this hexagonal crystal structure Al—Fe—Si alloy layer is high in hardness, so if this layer is thick, it impairs the ductility of the steel sheet itself and easily cracks when shaping the coated steel sheet. Therefore, the thickness of this hexagonal crystal structure Al—Fe—Si alloy layer is preferably controlled to 5 μm or less.

Control of the thickness of the alloy layer is substantially realized by the amount of Si in the bath and the bath temperature. If the bath temperature is too high, the alloy layer grows. In this way, it was learned that to stabilize the formation of AlN and the formation of the hexagonal crystal structure Al—Fe—Si alloy layer, it is effective to make the concentration of Si in the coating bath 4 to 11% and to hold the coating bath temperature at the relatively low temperature of 610 to 650° C.

If considered from the viewpoint of the concentration of Si in the bath, as guessed from the chemical formulas shown before, if comparing the hexagonal crystal structure Al—Fe—Si alloy layer and the monoclinic crystal Al—Fe—Si structure alloy layer, the Si contents differ. The former is about 10%, while the latter contains about 15% of Si. Therefore, if the amount of Si in the bath exceeds 11%, a monoclinic crystal structure Al—Fe—Si alloy layer is mainly formed and with an amount of Si in the bath of 4 to 11%, a hexagonal crystal structure Al—Fe—Si alloy layer easily forms. If the amount of Si in the bath is less than 4%, an Al—Fe compound which does not contain Si is easily formed.

Figure 5:
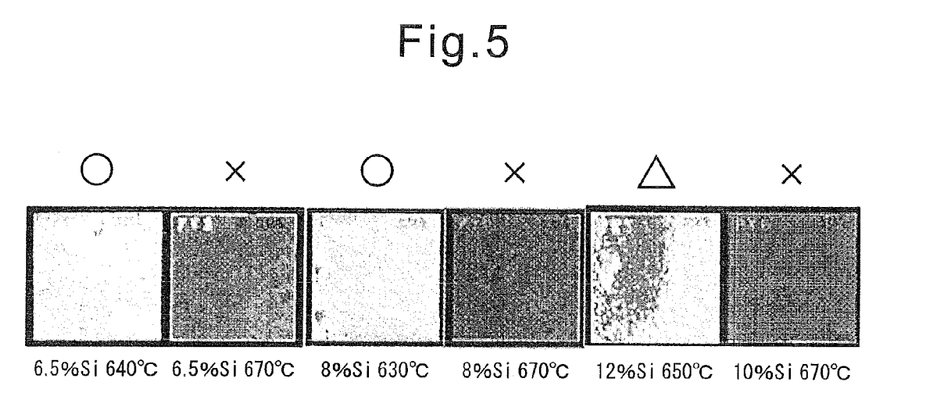
FIG. 5 shows the state of black discoloration of aluminum coated steel sheet due to the Al coating bath temperature and the Si concentration in the Al coating bath in the examples.
Figure 6:
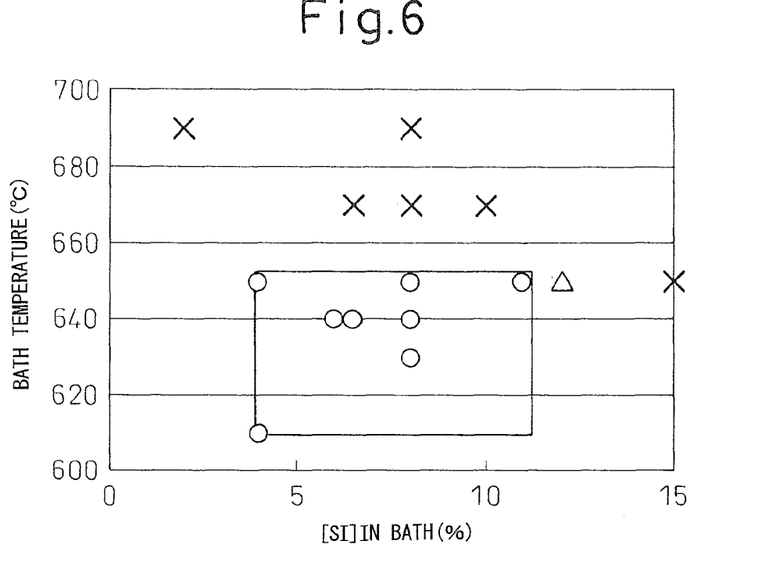
FIG. 6 shows the state of occurrence of black discoloration of aluminum coated steel sheet due to the Al coating bath temperature and the Si concentration in the Al coating bath in the examples.
Figure 7:
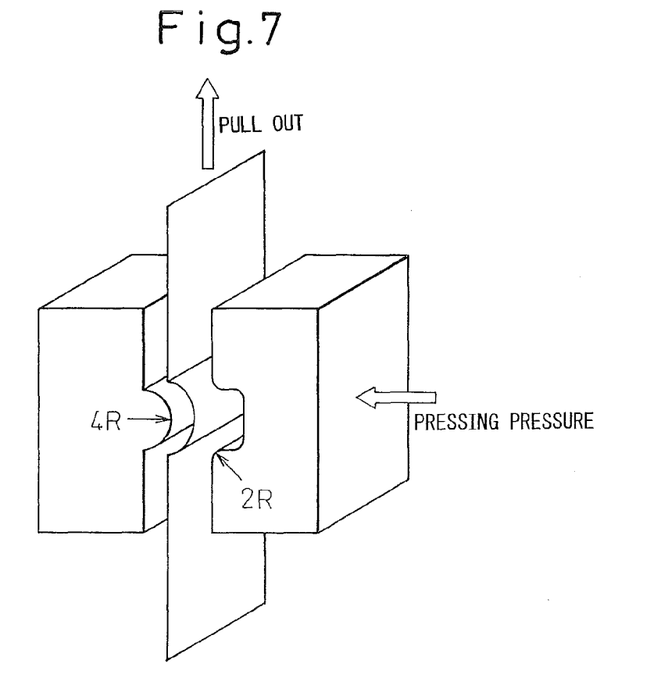
FIG. 7 is a conceptual view of a draw bead test.

FIG. 5 shows the state of black discoloration (photo) by the Al coating bath temperature and concentration of Si in the Al coating bath, while FIG. 6 shows the state of occurrence of black discoloration by the Si content in the bath and the bath temperature. The box in the figure shows an Si content of 4 to 11% and a bath temperature of 610 to 650° C. The ingredients of the steel material which forms the base material at this time are shown in Table 1.

TABLE 1

(mass %)

| C | Si | Mn | P | S | Al | N | O | Ni | Cu | C × 10 + Ni + Cu |
|---|----|----|---|---|----|---|---|----|----|------------------|
| 0.0020 | 0.002 | 0.254 | 0.016 | 0021 | 0.0020 | 0.0026 | 0.051 | 0.022 | 0.027 | 0.069 |

Further, the numerical values at the bottom of FIG. 5 indicate the Si concentrations in the baths and the bath temperatures. Further, in FIG. 6, the black discoloration is evaluated as G (good): no black discoloration, F (fair): partial black discoloration, and P (poor): total black discoloration. Even with a F (fair) evaluation, there is partial black discoloration, so the result cannot withstand practical use.

Next, the reasons for limitation of the ingredients in the present invention will be explained. First, the ingredients in the steel will be explained. Note that, the units of the ingredients in the steel are all mass %. C: If the concentration of the solid solution nitrogen is the same extent, the smaller the C content, the more improved the steel sheet is in workability. On the other hand, the ingredients of the present invention inevitably contain solid solution nitrogen, so the workability is somewhat inferior. Therefore, from the workability, lower C is better. In the present invention, this is limited to 0.01% or less. However, from the above gist, it is preferably 0.005% or less, more preferably 0.004% or less, furthermore preferably 0.0025% or less, still more preferably 0.001% or less. Further, to secure strength as a steel material, the lower limit is preferably 0.0005%.

Si: Si reacts with the oxygen in the steelmaking stage to remove the oxygen in the molten steel. Further, in the steel strip production process as well, there is a possibility of it reacting with the solid solution oxygen (O) in the steel. Further, Si reacts with N in the steel to form $Si_3N_4$, SiN, etc. and thereby reduce the solid solution nitrogen. Furthermore, if the amount of Si increases, it concentrates as oxides at the surface at the time of heating during the hot dip coating process, so noncoating defects are caused. Whatever the case, this is an element where a lower concentration is desirable. The content is limited to 0.05% or less, preferably 0.041% or less, more preferably 0.021% or less, furthermore preferably 0.01% or less, still more preferably 0.004% or less. The lower limit is 0.001% or so.

N: To prevent black discoloration after Al coating and maintain the gloss, it is necessary to leave this as solid solution nitrogen in the steel sheet. For this purpose, 0.0015% or more of N is necessary, preferably 0.0019% or more, more preferably 0.0024% or more, furthermore preferably 0.0031% or more. On the other hand, an increase in the solid solution nitrogen causes the steel sheet to harden and the yield stress and tensile strength to greatly rise and the elongation to fall. Further, the press formability also deteriorates. For this reason, the upper limit of the amount of N is made 0.0040%. In the present invention, as explained below, the concentration of Al in the steel material is low, so AlN does not form other than at the surface which contacts the aluminum coating layer. Therefore, the amount of N is substantially equal to the solid solution nitrogen.

Al: Al is normally used as a deoxidizer of molten steel in the steelmaking process. However, the Al which remains here reacts with the solid solution nitrogen in the steel strip production process to become AlN. This AlN is present diffused in the steel sheet and differs from the AlN which is present at the steel sheet and coating interface. For this reason, the amount of solid solution nitrogen becomes smaller, the concentration of AlN which forms at the interface becomes smaller, and the black discoloration preventing property after Al coating deteriorates, so the lower the amount of Al the better. For this reason, the upper limit is made 0.01%. It is preferably 0.005% or less, more preferably 0.003% or less, furthermore preferably 0.002% or less. The lower limit is made 0.001%.

O: If the steel contains oxygen, it becomes a source of inclusions, so usually the steel is deoxidized by Al, Si, etc. at the steelmaking stage. In the present invention steel, oxygen is contained in an amount of 0.03% or more, more preferably 0.042% or more, furthermore preferably 0.050% or more. The reason is that, as explained above, if the O in the steel is sufficient, there is the effect of stabilization of the heat black discoloration resistance. This effect is exhibited with oxygen at 0.03%. However, again, if the oxygen content increases, due to inclusions, deterioration of the workability is invited, so the upper limit of O is made 0.08%, more preferably 0.065%.

Ti, B: These elements form compounds with N. Therefore, to secure solid solution nitrogen, the smaller the contents the better.

P, S: These are known as impurities which easily segregate at the surface. For economic refining, the lower limits of P and S are made 0.002%. On the other hand, P is an element which causes the steel sheet embrittlement. S also impairs the ductility of the steel sheet. For this reason, the upper limits are respectively made 0.1%. Further, the more preferable upper limit of P is 0.066%, while the more preferable upper limit of S is 0.081%.

Ni, Cu: These elements are austenite-forming elements which easily concentrate at the surface and, as explained above, are important elements which give an effect of improvement of the heat black discoloration resistance. That is, it is learned that at the interface of the steel sheet and aluminum coating, the austenite-forming element C concentrates at the interface and may assist concentration of N. Therefore, the inventors further added the austenite-forming elements Cu and Ni and investigated their effects. As a result, they confirmed that if adding Cu or Ni, the AlN layer more easily forms. On the other hand, if there is no Cr, which is one of the ferrite-forming elements, there is an effect, though extremely small, while if there is Cr, that effect is lost. so it is not preferable to jointly use Cr for addition. Therefore, Cr is made 0.02% or less, that is, the level of unavoidable impurities.

The lower limit of Ni is 0.01%, preferably 0.018%, more preferably 0.029%. Further, the lower limit of Cu is 0.01%, more preferably 0.022%, furthermore preferably 0.041%. Excessive addition of Ni or Cu causes formation of defects in hot rolling, so the upper limit is made 0.1%. By satisfying these lower limits, formation of AlN is promoted and black discoloration can be suppressed.

Furthermore, $10 \times C+Ni+Cu>0.03$. This prescribes the above-mentioned three types of elements of the above-mentioned austenite-stabilizing elements and the surface concentration elements. Mn is also an austenite-stabilizing element, but does not become large in concentration at the surface, so will be excluded from here. By adding these elements, it becomes possible to form AlN at the alloy layer-steel sheet interface and becomes possible to suppress black discoloration up to a maximum 550° C. even without post annealing.

The elements other than the elements explained above are not particularly limited, but Mn is usually contained in an amount of 0.2 to 0.8%.

(Regarding Al Coating)

Next, the reasons for limitation of Si in the Al coating layer and hot dip Al coating bath will be explained. Note that, the units are mass % (in the following explanation, indicated simply as "%"). In Al coating not containing Si, the Al—Fe intermetallic compound layer (usually referred to as the "alloy layer": $FeAl_3$ or $Fe_2Al_5$) easily grows thicker. The grown alloy layer causes coating peeling at the time of working. Usually, Si is added for suppressing this alloy layer growth. For the purpose of reducing the alloy layer, the amount of Si has to be at least 4%. On the other hand, the effect becomes saturated at 11% or so. Addition of more than that causes the corrosion resistance and the workability to fall. Therefore, the upper limit of the amount of Sin in the coating bath is made 11% and the lower limit is made 4%. Further, as unavoidable elements other than Al and Si in the bath, the Fe which usually leaches out from the coated steel sheet or the coating equipment is contained in about 2%, but the invention is not particularly limited to this.

In the present invention, the inventors discovered that the amount of Si in the Al coating bath is particularly preferably 4 to 11% and the bath temperature is 610 to 650° C. By Al coating under these conditions, it is possible to exhibit heat black discoloration resistance up to 550° C. even without post annealing. At the time of Al coating as well, the solid solution nitrogen in the steel and the coating ingredients react to form an Al interface between the steel sheet and the coating bath. At the time of this condition, the alloy layer becomes a hexagonal crystal structure Al—Fe—Si alloy layer and more AlN is produced more easily. Furthermore, if the bath temperature is too low, the bath viscosity is high, so control of the amount of deposition becomes difficult, so operation at a temperature which is lower than 610° C. is difficult.

As other additive elements of the Al coating layer and the coating bath, Mn, Cr, Mg, Ti, Zn, Sb, Sn, Cu, Ni, Co, In, Bi, Mischmetal, etc. are possible but insofar as the coating layer is mainly comprised of Al, application is possible. The addition of Zn or Mg is effective in the sense of making formation of red rust difficult, but excessive addition of these elements with their high vapor pressures leads to the formation of fumes of Zn and Mg, formation of powdery substances derived from Zn and Mg on the surface, etc. Addition of Zn: 30 mass % or more or Mg: 5 mass % or more is not preferable.

Further, as treatment after coating, chemical conversion, resin coating, etc. may be performed for the purpose of primary rust proofing and lubrication. Regarding chromate treatment, if considering the recent regulations against hexavalent chrome, a trivalent treatment coating is preferable. In addition, post treatment other than inorganic chromate is also possible. To impart lubrication ability, a wax, alumina, silica, $MoS_2$, etc. may be used to treat the surface in advance.

The amount of deposition of the Al coating layer is not particularly limited, but usually is 80 to 120 $g/m^2$ at the two surfaces. With this amount of deposition, there is no particular problem.

Conventional Al coated steel sheet excellent in heat black discoloration resistance was treated by post annealing. Due to the additional annealing, the Al coating layer fell in hardness. This corresponds to the microprecipitation of Fe in solid solution in the Al. The hardness of the Al coating layer before additional annealing was, by Knoop hardness, 90 to 110, while fell to 50 to 80 after additional annealing. Here, the "Knoop hardness" differs from the Vickers hardness in indenter shape. The test method is prescribed in JIS (Japan Industrial Standard) Z2251 (2009). When measuring the hardness of a cross-section of a 10 to 30 μm coating layer, measurement is difficult by a Vickers indenter, so it was decided to define this by the Knoop hardness. In general, an Al coated steel sheet is considered to be susceptible to galling at the time of press formation, but if annealing, this galling occurs more easier still, so this was considered a problem. The present invention improves the heat black discoloration resistance without annealing treatment, so improvement in the press formability can be expected.

(Evaluation of Heat Black Discoloration Resistance)

The black discoloration was evaluated by annealing at 10° C. increments of temperature from 520° C. to 580 for 200 hours each and visually examining for black discoloration of the surface. Further, it is known that at the heating temperatures of these evaluations, AlN is further not formed and only black discoloration proceeds. Table 2 shows the results of evaluation of the heat black discoloration resistance and evaluation of the workability in examples of the present invention. As will be understood from the results of Table 2, the present invention products were confirmed to not discolor black up to 50° C. even without annealing. At the black discoloration temperatures of conventional products (see patent literature), products without post annealing had black discoloration temperatures of 520° C. and 530° C., so this shows an improvement in the heat resistance from the viewpoint of black discoloration, that is, the heat black discoloration resistance. Further, this is substantially the same as the black discoloration temperature after annealing of the conventional products (see patent literature). The advantageous effect of the present invention has therefore been verified.

It is not desirable to treat the steel sheet of the present application by box annealing etc. after coating (also called "post annealing" or "additional annealing"). As stated previously, this is because annealing causes the Al coating to fall in hardness and galling to easily occur at the time of press forming. Further, when applying box annealing, warping etc. causes the steel sheet to lose its shape, so after that a skin pass and running the sheet through a straightening line are necessary. In the end, three extra steps become required. This is not preferable from the viewpoint of the productivity and the manufacturing costs.

EXAMPLES

Below, examples will be used to explain the present invention in further detail.

Example 1

Cold rolled steel sheets of the steel ingredients such as shown in Table 2 which were run through ordinary hot rolling steps and cold rolling processes (sheet thicknesses of 0.8 mm) were used as materials for hot dip Al coating. The hot dip Al coating was performed using a nonoxidizing furnace-reduction furnace type line, using the gas wiping method to adjust the amounts of coating deposition after coating at the two surfaces to about 80 g/m$^2$, then cooling. The annealing temperature at this time was about 800° C., while the composition of the coating bath was Al-9% Si-2% Fe. The Fe in the bath was supplied from the coating devices in the bath and the strip and was unavoidable. Further, the bath temperature was made 645° C. The coating appearance was free from noncoating defects etc. and good. Part of the prepared samples were further post annealed using a box annealing furnace in the atmosphere at 380° C. for 10 hours, then were further temper rolled 1%. For the rolls at the time of temper rolling, dull rolls were used. The properties of the thus prepared samples were evaluated.

(1) Heat Black Discoloration Resistance

Samples (50 mm×100 mm) were annealed in a box annealing furnace at constant temperatures of 520 to 580° C. for 200 hr. After annealing, they were judged for any black discoloration by visual judgment and observation of the cross-sectional structure. The heat black discoloration resistance was evaluated as G (good): no black discoloration, F (fair): partial black discoloration, and P (poor): total black discoloration. Even with a F (fair) evaluation, there is partial black discoloration, so the result cannot withstand practical use.

The temperature conditions which are sought as the heat black discoloration resistance differ depending on the environment to which the used member is exposed. In toaster, hot plate, or other home electrical appliance, the demanded temperature is often a low one of 500° C. or less, but in the case of a fan heater or gasoline-fueled heater, it is 550° C. or so, while in the case of use for a muffler of an automobile or a motorcycle, a black discoloration temperature over 550° C. is sought. In such an application, inherently an over 600° C. temperature is sought, but by making some design modifications etc., it is also possible to lower the temperature demanded from the material. For example, it is also possible to insert a heat insulating material and make the temperature of the material 550° C. Conversely, by making the black discoloration temperature of the material rise, it is possible to increase the freedom of design and reduce the heat insulating material.

(2) Sheet Workability

Press oil was coated, then a blank of a diameter of 100 mm was drawn by a punch diameter of 50 mm (drawing ratio 2.0) to judge if drawing was possible. The sheet workability was evaluated as G (good): no abnormalities and P (poor): cracks.

(3) Method of Identification of AlN and Hexagonal Crystal Structure Al—Fe—Si

The presence of AlN was based on detection of the N peak at the alloy layer-steel sheet interface by DS. Further, the GDS was made one which performs measurement after the Al coating is removed by electrolytic stripping. On the other hand, the "hexagonal crystal structure Al—Fe—Si alloy layer" indicates a layer the same as described as (Al—Fe—Si)H. This also can be identified by X-ray diffraction from the surface after electrolytic stripping of the Al coating layer.

(4) Plating Workability

A draw bead test was performed on a test piece of a sheet thickness of 0.8 mm and dimensions of 30×200 mm. The shape of the die at this time is shown in FIG. 6. The surface roughness of the die was made an Ra of about 1.2 µm. After coating the press oil, draw beads were formed for 10 samples consecutively. The state of galling at the 10th sample was judged visually. The pressing load at this time was 500 kgf and the sheet thickness reduction rate was about 12%. Note that, this test was not performed at the level of sheet workability judged "x" (poor).

Judgment criteria: G (good): no galling, F (fair): galling at part of sample, P (poor): galling occurring at entire surface of sample (5) Types of Alloy Layer and Hardnesses of Coating Layer To differentiate between the types of alloy layers, the compositions of the alloy layers were measured from the cross-sections. Any seven points at locations corresponding to the alloy layer of the polished cross-section alloy layer were measured by EPMA analysis and the value of Si/(Al+Fe+Si) was calculated. At this time, the values were calculated by mass %. When this value was 8 to 11%, the layer was defined as a monoclinic crystal structure Al—Fe—Si alloy layer, while when it was 12 to 16%, the layer was defined as a hexagonal crystal structure Al—Fe—Si alloy layer. When the value corresponded to neither of these, the sample was remeasured. When five points out of seven points measured were a hexagonal crystal structure Al—Fe—Si alloy layer, it was judged that this alloy layer was a hexagonal crystal structure Al—Fe—Si alloy layer. Conversely, when five points in seven points were a monoclinic crystal structure Al—Fe—Si alloy layer, this alloy layer was judged to be a monoclinic crystal structure Al—Fe—Si alloy layer. When a hexagonal crystal structure Al—Fe—Si alloy layer and a monoclinic crystal structure Al—Fe—Si alloy layer were both found in four points or less, it was deemed that both were formed. In the entries in Tables 3 and 4, these are indicated by only "H" and "M". When both a hexagonal crystal structure Al—Fe—Si alloy layer and a monoclinic crystal structure Al—Fe—Si alloy layer are formed, this is indicated by "H+M". For the hardness of the Al coating layer, the sample cross-section samples were used and the Knoop hardnesses were measured aiming at the Al location of the Al coating layer. Five points were measured and the average value was calculated. The load at this time was made 3 gf. The Knoop hardness was measured using a microhardness gauge MVK-G3 made by Akaishi Seisakusho.

Table 2 shows details of the samples and results of evaluation. In Table 2, values of ingredients which are surrounded by boxes show values deviating from the ingredients of the present application.

TABLE 2

| Symbol | C | Si | Mn | P | S | Al | N | O | Ni | Cu | C × 10 + Ni + Cu |
|---|---|---|---|---|---|---|---|---|---|---|---|
| A | 0.016 | 0.021 | 0.33 | 0.02 | 0.02 | 0.001 | 0.0023 | 0.051 | 0.061 | 0.072 | 0.293 |
| B | 0.0051 | 0.11 | 0.29 | 0.082 | 0.046 | 0.003 | 0.0031 | 0.033 | 0.081 | 0.096 | 0.228 |
| C | 0.0055 | 0.019 | 0.41 | 0.11 | 0.031 | 0.005 | 0.0031 | 0.044 | 0.022 | 0.084 | 0.161 |
| D | 0.0070 | 0.02 | 0.71 | 0.011 | 0.13 | 0.003 | 0.0033 | 0.056 | 0.067 | 0.014 | 0.151 |
| E | 0.0031 | 0.005 | 0.25 | 0.014 | 0.018 | 0.012 | 0.0034 | 0.061 | 0.048 | 0.072 | 0.151 |
| F | 0.0029 | 0.021 | 0.30 | 0.019 | 0.034 | 0.004 | 0.0012 | 0.040 | 0.020 | 0.085 | 0.134 |
| G | 0.0014 | 0.007 | 0.31 | 0.018 | 0.023 | 0.003 | 0.0025 | 0.022 | 0.044 | 0.014 | 0.072 |
| H | 0.0024 | 0.006 | 0.29 | 0.017 | 0.023 | 0.004 | 0.0049 | 0.035 | 0.024 | 0.027 | 0.075 |
| I | 0.0014 | 0.007 | 0.31 | 0.018 | 0.023 | 0.003 | 0.0025 | 0.110 | 0.070 | 0.019 | 0.103 |
| J | 0.0022 | 0.005 | 0.24 | 0.021 | 0.021 | 0.003 | 0.0027 | 0.044 | 0.002 | 0.003 | 0.028 |
| K | 0.0023 | 0.003 | 0.23 | 0.013 | 0.021 | 0.002 | 0.0034 | 0.042 | 0.014 | 0.020 | 0.057 |
| L | 0.0027 | 0.003 | 0.23 | 0.014 | 0.030 | 0.002 | 0.0029 | 0.038 | 0.020 | 0.030 | 0.077 |
| M | 0.0015 | 0.008 | 0.30 | 0.019 | 0.026 | 0.003 | 0.0027 | 0.049 | 0.025 | 0.044 | 0.084 |
| N | 0.0025 | 0.002 | 0.21 | 0.014 | 0.020 | 0.002 | 0.0022 | 0.050 | 00037 | 0.055 | 0.117 |
| O | 0.0066 | 0.031 | 0.47 | 0.021 | 0.032 | 0.002 | 0.0038 | 0.069 | 0.064 | 0.093 | 0.223 |
| P | 0.0023 | 0.007 | 0.23 | 0.018 | 0.022 | 0.003 | 0.0019 | 0.045 | 0.019 | 0.054 | 0.096 |
| Q | 0.0025 | 0.006 | 0.23 | 0.019 | 0.023 | 0.002 | 0.0024 | 0.051 | 0.071 | 0.033 | 0.129 |

As shown in Table 2, if the amounts of C, Si, P, S, O, and N are too great, the sheets are impaired in workability (Nos. 1 to 4, 8, and 9). Regarding the heat black discoloration resistance, by setting the steel ingredients of the invention examples (Table 3, Nos. 11 to 17), even without annealing, it was possible to prevent black discoloration due to alloying up to 540° C. and Ni and it was possible to prevent black discoloration up to 550° C. by adding a predetermined amount or more of Cu. As clear by comparing Nos. 11 to 13, it was confirmed that if adding more Ni and Cu in the steel, the heat black discoloration resistance is improved. The actions of Ni and Cu are believed to be due to making the formation of AlN easier together with the C. In No. 10, at 530° C., black discoloration can be prevented. By adding Ni and Cu, an effect of a 20° C. rise of the black discoloration temperature was observed. 550° C. was a black discoloration temperature which could not be achieved without a conventional annealing step. Note that, Nos. 18 to 24 show the results of evaluation of the properties when applying post annealing. The black discoloration temperature rose by a further 20° C. by applying annealing. However, at this time, the Al coating fell in hardness and pressing caused galling. This is believed to be because the Al coating layer fell in hardness. Note that, by annealing, the alloy layer was found to be completely a monoclinic crystal structure Al—Fe—Si alloy layer. As explained in the detailed description, a monoclinic crystal structure Al—Fe—Si alloy layer is stable in phase at a lower temperature than a hexagonal crystal structure Al—Fe—Si alloy layer and is judged to be produced by transformation in the annealing step.

TABLE 3

| No. | Sheet | Heat black discoloration resistance (no annealing) | | | | Sheet work-ability | Coating work-ability | Alloy layer | Alloy layer thickness (μm) | Al coating hardness | Remarks |
|---|---|---|---|---|---|---|---|---|---|---|---|
| | | 530° C. | 540° C. | 550° C. | 560° C. | | | | | | |
| 1 | A | G | G | G | P | P | G | H | 6 | 110 | Comp. ex. |
| 2 | B | G | G | G | P | P | G | H | 3 | 94 | Comp. ex. |
| 3 | C | G | G | G | P | P | G | H | 6 | 109 | Comp. ex. |
| 4 | D | G | G | G | P | P | G | H | 3 | 90 | Comp. ex. |
| 5 | E | P | P | P | P | G | G | H | 3 | 107 | Comp. ex. |
| 6 | F | P | P | P | P | G | G | H | 3 | 96 | Comp. ex. |
| 7 | G | G | P | P | P | G | G | H | 3 | 98 | Comp. ex. |
| 8 | H | G | G | G | P | P | G | H | 5 | 106 | Comp. ex. |
| 9 | I | G | G | G | P | P | G | H | 3 | 91 | Comp. ex. |
| 10 | J | G | P | P | P | G | G | H | 3 | 96 | Comp. ex. |
| 11 | K | G | G | G | P | G | G | H | 3 | 96 | Inv. ex. |
| 12 | L | G | G | G | P | G | G | H | 3 | 93 | Inv. ex. |
| 13 | M | G | G | G | P | G | G | H | 5 | 102 | Inv. ex. |
| 14 | N | G | G | G | P | G | G | H | 5 | 110 | Inv. ex. |
| 15 | O | G | G | G | P | G | G | H | 3 | 97 | Inv. ex. |
| 16 | P | G | G | G | P | G | G | H | 3 | 91 | Inv. ex. |
| 17 | Q | G | G | G | P | G | G | H | 3 | 92 | Inv. ex. |

| No. | Sheet | Heat black discoloration resistance (with post annealing) | | | | Sheet work-ability | Coating work-ability | Alloy layer | Alloy layer thickness (μm) | Al coating hardness | Remarks |
|---|---|---|---|---|---|---|---|---|---|---|---|
| | | 550° C. | 560° C. | 570° C. | 580° C. | | | | | | |
| 18 | K | G | G | G | P | G | P | M | 3 | 78 | Comp. ex. |
| 19 | L | G | G | G | P | G | P | M | 3 | 77 | Comp. ex. |
| 20 | M | G | G | G | P | G | P | M | 3 | 56 | Comp. ex. |
| 21 | N | G | G | G | P | G | P | M | 3 | 73 | Comp. ex. |
| 22 | O | G | G | G | P | G | P | M | 3 | 51 | Comp. ex. |
| 23 | P | G | G | G | P | G | P | M | 3 | 74 | Comp. ex. |
| 24 | Q | G | G | G | P | G | P | M | 3 | 58 | Comp. ex. |

Example 2

The steel L of Table 1 (ingredients corresponding to invention example) was used for coating while changing the amount of Si in the Al coating bath and the bath temperature. The amount of deposition was made the same as Example 1, that is, 80 g/m² at both surfaces. The thus produced samples were evaluated. The evaluation conditions and the evaluation criteria were made the same as Example 1. Note that, here, before Al processing, post annealing was not performed. The coating was evaluated as is. Table 4 shows the relationship between the coating conditions (amount of Si in bath and bath temperature) and the heat black discoloration resistance and workability. Note that, at this time, the cross-section was observed under a microscope to measure the thickness of the alloy layer. The results are shown in Table 4.

TABLE 4

| No. | Sheet | Amount of Si in bath (%) | Bath temp. (° C.) | Heat black discoloration resistance (as coated) 540° C. | 550° C. | 560° C. | Sheet workability | Coating workability | Alloy layer | Alloy layer thickness (μm) | Al coating hardness | Remarks |
|---|---|---|---|---|---|---|---|---|---|---|---|---|
| 1 | L | 2 | 690 | P | P | P | P | G | Fe₂Al₅ | 10 | 95 | Comp. ex. |
| 2 | L | 4 | 650 | G | G | P | G | G | H | 4 | 90 | Inv. ex. |
| 3 | L | 6 | 640 | G | G | P | G | G | H | 3 | 103 | Inv. ex. |
| 4 | L | 8 | 640 | G | G | P | G | G | H | 3 | 104 | Inv. ex. |
| 5 | L | 11 | 650 | G | G | P | G | G | H | 3 | 99 | Inv. ex. |
| 6 | L | 15 | 650 | G | P | P | G | G | M | 4 | 95 | Comp. ex. |
| 7 | L | 8 | 650 | G | G | P | G | G | H | 3 | 97 | Inv. ex. |
| 8 | L | 8 | 630 | G | G | P | G | G | H | 2 | 100 | Inv. ex. |
| 9 | L | 8 | 690 | G | G | P | P | — | H | 6 | 94 | Comp. ex. |
| 10 | L | 4 | 650 | G | G | P | G | G | H | 3 | 99 | Inv. ex. |
| 11 | L | 4 | 610 | G | G | P | G | G | H | 2 | 96 | Inv. ex. |

In Table 4, when, like in Sample 1, the amount of Si in the bath is a small 2%, the coating bath becomes higher in melting point, so a high bath temperature is required. Further, when the amount of Si is 2%, alloying of Al and Fe easily occurs and an alloy layer grows in the bath. The alloy layer is hard, so the ductility of the steel sheet itself is impaired. For this reason, in Sample 1, the workability of the sheet fell. At this time, the heat black discoloration resistance was also inferior.

The Al coating conditions affect the heat black discoloration resistance. In Nos. 2 to 11, the heat black discoloration resistance when changing the amount of Si in the coating bath and the bath temperature was evaluated. With an amount of Si of 15%, the heat black discoloration resistance became inferior. At this time, the alloy layer became a monoclinic crystal structure Al—Fe—Si alloy layer. At less than the bath temperature 610° C., the bath became too high and therefore Al coating was difficult. Note that, the No. 1 alloy layer did not correspond to either a hexagonal crystal structure Al—Fe—Si alloy layer or a monoclinic crystal structure Al—Fe—Si alloy layer. From results of analysis, it was judged to be Fe₂Al₅, so was described in that way. In No. 9, the bath temperature was raised and the alloy layer was increased in thickness. Under such conditions, the alloy layer became too thick and therefore the shapeability of the steel sheet was impaired.

Above, preferred embodiments of the present invention were explained, but the present invention is not limited to these examples of course. A person skilled in the art clearly could conceive of various modifications or revisions within the scope which is described in the claims. These of course naturally are understood to fall under the technical scope of the present invention.

INDUSTRIAL APPLICABILITY

The present invention can be utilized for steel materials which are used at high temperatures of 550° C. or so, in particular for those which are used for applications stressing the beauty of the appearance. According to the present invention, it is possible to produce such steel materials which are used at high temperatures of 550° C. or so and which stress beauty, with good productivity and with low costs.

REFERENCE SIGNS LIST 10 capped steel 10
10' killed steel 10'
11 AlN barrier layer 11
12 hexagonal crystal structure Al—Fe—Si alloy layer 12
12' monoclinic crystal structure Al—Fe—Si alloy layer 12'
13 Al coating layer
14 θ-phase or η-phase
15 AlN layer

The invention claimed is:

1. A hot dip Al coated steel sheet which is excellent in heat black discoloration resistance which comprises a steel sheet which consists of, by mass %,
   C: 0.0005 to less than 0.01%,
   Si: 0.001 to 0.05%,
   P: 0.002 to 0.1%,
   S: 0.002 to 0.1%,
   Al: 0.001 to 0.01%,
   N: 0.0015 to 0.0040%
   O: 0.03 to 0.08%,
   Mn: 0.2 to 0.8%, and
   furthermore, one or both of
   Ni: 0.01 to 0.1% or
   Cu: 0.01 to 0.1%,
   satisfies 10×C+Ni+Cu>0.03, and
   has a balance of Fe and unavoidable impurities,
   on the surface of the steel sheet is provided
   an Al coating layer which contains, by mass %, Si: 4 to 11%, which has a balance of Al and unavoidable impurities, and which has a Knoop hardness of 90 to 110, the Al coating layer and the steel sheet interface having a less than 5 μm thick Al—Fe—Si alloy layer between them.

2. The hot dip Al coated steel sheet which is excellent in heat black discoloration resistance as set forth in claim 1 wherein an interface of said steel sheet and said Al—Fe—Si alloy layer has MN present, said Al—Fe—Si alloy layer is a hexagonal crystal structure Al—Fe—Si alloy layer, and that hexagonal crystal structure Al—Fe—Si alloy layer has a thickness of less than 5 μm.

3. The hot dip Al coated steel sheet which is excellent in heat black discoloration resistance as set forth in claim 1 or 2 wherein said hot dip aluminum coated steel sheet which is excellent in heat black discoloration resistance is not post annealed.

4. A method of production of the hot dip Al coated steel sheet which is excellent in heat black discoloration resistance as set forth in claim 1, comprising coating the steel sheet as a coating sheet by Al coating during which making an amount of Si in an Al coating bath 4 to 11% and making a bath temperature 610 to 650° C. and then not performing post annealing before working.

\* \* \* \* \*